United States Patent
Swift

(10) Patent No.: US 10,340,531 B2
(45) Date of Patent: Jul. 2, 2019

(54) LI—SI—SN ALLOY, ANODE MATERIAL OF THE ALLOY, AND BATTERIES INCLUDING SAME

(71) Applicant: EAGLEPICHER TECHNOLOGIES, LLC, Joplin, MO (US)

(72) Inventor: Geoffrey Swift, Joplin, MO (US)

(73) Assignee: EaglePicher Technologies LLC, St. Louis, MO (US)

( * ) Notice: Subject to any disclaimer, the term of this patent is extended or adjusted under 35 U.S.C. 154(b) by 665 days.

(21) Appl. No.: 13/790,346

(22) Filed: Mar. 8, 2013

(65) Prior Publication Data

US 2016/0013499 A1 Jan. 14, 2016

(51) Int. Cl.
| | |
|---|---|
| *H01M 6/36* | (2006.01) |
| *H01M 4/06* | (2006.01) |
| *C22C 24/00* | (2006.01) |
| *H01M 4/38* | (2006.01) |
| *C22C 1/04* | (2006.01) |
| *H01M 4/02* | (2006.01) |

(52) U.S. Cl.
CPC .............. *H01M 6/36* (2013.01); *C22C 1/0408* (2013.01); *C22C 24/00* (2013.01); *H01M 4/06* (2013.01); *H01M 4/386* (2013.01); *H01M 2004/027* (2013.01)

(58) Field of Classification Search
CPC .... H01M 4/1395; H01M 4/134; H01M 4/386; H01M 4/387; H01M 4/405; H01M 10/052
USPC .......................................... 429/112, 209–246
See application file for complete search history.

(56) References Cited

U.S. PATENT DOCUMENTS

| | | | | |
|---|---|---|---|---|
| 4,189,529 A | * | 2/1980 | Birt | H01M 10/399 |
| | | | | 429/103 |
| 5,869,208 A | * | 2/1999 | Miyasaka | H01M 4/131 |
| | | | | 429/215 |
| 2002/0119373 A1 | * | 8/2002 | Gao | H01M 4/13 |
| | | | | 429/218.1 |
| 2006/0057463 A1 | * | 3/2006 | Gao | C01B 33/02 |
| | | | | 429/231.95 |
| 2010/0310917 A1 | * | 12/2010 | Swift | H01M 4/382 |
| | | | | 429/112 |

OTHER PUBLICATIONS

Beaulieu, L. Y., K. C. Hewitt, R. L. Turner, A. Bonakdarpour, A. A. Abdo, L. Christensen, K. W. Eberman, L. J. Krause, and J. R. Dahn. "The Electrochemical Reaction of Li with Amorphous Si—Sn Alloys." Journal of the Electrochemical Society J. Electrochem. Soc. 150.2 (2003): A149-155.*

\* cited by examiner

*Primary Examiner* — Jimmy Vo
(74) *Attorney, Agent, or Firm* — LSIP Law LLC; Linda Saltiel

(57) ABSTRACT

An alloy includes lithium, silicon and tin. An anode may be formed of an anode material containing the alloy of lithium, silicon and tin. The anode material may include an electrolyte. The anode material may be a pressed powder pellet that is solid at ambient temperature. A battery, for example, a thermal battery, can contain an electrolyte-separator, a cathode, and/or an anode with the alloy of lithium, tin and silicon. The anode formed of the alloy consisting of lithium, tin and silicon can have a melting point from about 500° C. to about 600° C. or higher making it suitable for use in a thermal battery.

14 Claims, 5 Drawing Sheets

LI—SI—SN ALLOY, ANODE MATERIAL OF THE ALLOY, AND BATTERIES INCLUDING SAME

BACKGROUND

The field of this disclosure generally relates to alloys capable of use as an anode material in batteries. The disclosure also relates to a composite material capable of use as an anode material that contains the alloy, and to batteries (e.g., thermal batteries) that contain such anode materials.

Thermal batteries tend to have relatively long shelf lives, high energy densities, require relatively low maintenance, and can withstand relatively high temperatures. Thermal batteries also tend to provide a short burst of power over a relatively short period of time. The burst may range from less than a second to an hour or more, with power typically ranging from about a watt or less to kilowatts. Such properties make thermal batteries suitable for military (e.g., batteries for missile guidance systems) and space exploration applications. Thermal batteries also are useful as back-up batteries in applications that require high reliability. Thermal batteries may also be used in other applications, such as in electric vehicles.

A typical thermal battery includes an anode, a cathode, an electrolyte-separator containing a solid electrolyte that is non-conductive at ambient temperature, and a pyrotechnic material (e.g., heat pellet, which may contain, for example, Fe—$KClO_4$ powder) that provides a heat source to the battery. When battery operation is desired, an external stimulus is applied to the battery. For example, an electrical current may be applied to the battery to set off an electric match or an electro-active squib, or a mechanical force (e.g., mechanical shock) may be applied to set off a concussion primer. The external stimulus causes the pyrotechnic material to ignite and begin to heat. Heat produced from the pyrotechnic material causes the previously solid electrolyte to melt and become conductive, which allows the battery to provide power for a desired application.

Thermal batteries are often formed using pellet techniques, such that each of the electrolyte, cathode, anode, and heat source are formed into a wafer (pellet). In this case, the respective cell component chemicals are processed into powders and the powders are pressed together to form the wafer (or pellet). Each component may be formed as a discrete part, or the anode and/or cathode may include (i.e., be flooded with) electrolyte material to improve the conductivity of that component. The electrolyte material in the anode and cathode may or may not contain binder material.

Electrolytes for use with thermal batteries often include a eutectic mixture (i.e., a mixture which melts at a temperature lower than each of the individual components) of lithium chloride and potassium chloride and a binder (such as MgO, fumed silica or kaolin), which assists in containing the electrolyte within the thermal battery assembly upon melting, such as by capillary action, surface tension, or both. With typical thermal battery electrolyte-separators, a binder prevents the electrolyte material from dispersing throughout the battery, which would cause undesired shunts or short circuits in the cell.

Cathode materials for thermal batteries may vary in accordance with a variety of design parameters and generally include a metal oxide or metal sulfide. By way of example, iron oxide ($Fe_3O_4$), iron disulfide ($FeS_2$) or cobalt disulfide ($CoS_2$) are often used as cathode materials.

The anodes of thermal batteries are generally formed of an alkali or alkaline earth metal or alloy. A typical anode includes lithium metal or a lithium alloy, such as lithium aluminum, lithium silicon, or lithium boron.

A thermal battery may consist of a single series of stacked cells or two or more parallel stacks of the series of stacked cells. The cell stack(s) may be insulated as thoroughly as possible, placed in a container, which may be made of stainless steel, and the container is sealed to form a hermetic seal, such as by welding. Electrical connections may be provided through standard glass to metal seals.

As noted above, typical thermal batteries make use of lithium-aluminum and lithium-silicon anode alloys. In order to reduce the volume of the anode pellets, the density of the anode pellets is increased by adding iron powder to the lithium-aluminum or lithium-silicon alloy powder prior to pressing. However, the iron does not contribute to the performance of the anode.

A continuing need exists for anode materials that are formed of alloys that result in improvements in conductivity, voltage, impedance, and lifetime without sacrificing density and volume. A continuing need also exists for primary batteries, such as thermal batteries, that incorporate such materials and exhibit such improved performance.

SUMMARY

The present disclosure provides improved alloys that may be used as anode materials for use in thermal batteries, and to batteries including anodes made from such alloys. Anodes in accordance with the present disclosure and batteries containing such anodes are generally characterized by enhanced conductivity, increased voltage and/or longer lifetime compared to conventional anodes and batteries.

In an exemplary aspect of the present disclosure, an alloy is formed including at least lithium (Li), silicon (Si) and tin (Sn). In preferred embodiments, the alloy may include at least about 40 wt % of lithium, at least about 25 wt % of silicon, and at least about 10 wt % of tin.

In another aspect of the present disclosure, a composite material includes free lithium and an alloy including at least lithium, silicon and tin. The composite material may be used as an anode material. The alloy preferably may include at least about 40 wt % of lithium, at least about 25 wt % of silicon, and at least about 10 wt % of tin.

In yet another aspect of the present disclosure, an anode material for use in batteries, such as thermal batteries, is made from an alloy including at least lithium, silicon and tin. The anode material may be a composite of the alloy and free lithium. The alloy preferably may include at least about 40 wt % of lithium, at least about 25 wt % of silicon, and at least about 10 wt % of tin.

In yet another aspect of the present disclosure, a battery includes an anode material, a cathode material, and an electrolyte-separator material. The anode material may include the above alloy that contains at least lithium, silicon and tin, or a composite of the alloy and free lithium.

In some embodiments, the alloy or composite is in the form of a powder, which is pressed to form a pellet suitable for use as an anode. The powder preferably is mixed with a powder electrolyte prior to pressing.

In preferred embodiments, the alloy of lithium, silicon and tin includes about 40 wt % to about 45 wt % of lithium, about 25 wt % to about 50 wt % of silicon, and about 10 wt % to about 35 wt % of tin.

The anode material including an alloy of lithium, silicon, and tin may have a melting point above 500° C. and up to about 600° C. or higher, which makes the anode suitable for use in a thermal battery or battery element. The anode melting point of greater than 500° C. to 600° C. is comparable to the anode melting point of conventional thermal batteries.

There are various refinements of the features noted in relation to the above-mentioned aspects. Further features may also be incorporated in the above-mentioned aspects. The above aspects, refinements, and additional features may exist individually or in any combination. For instance, various features discussed below in relation to any of the illustrated embodiments may be incorporated into any of the above-described aspects of the present disclosure, alone or in any combination thereof.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE EMBODIMENTS

Figure 1:
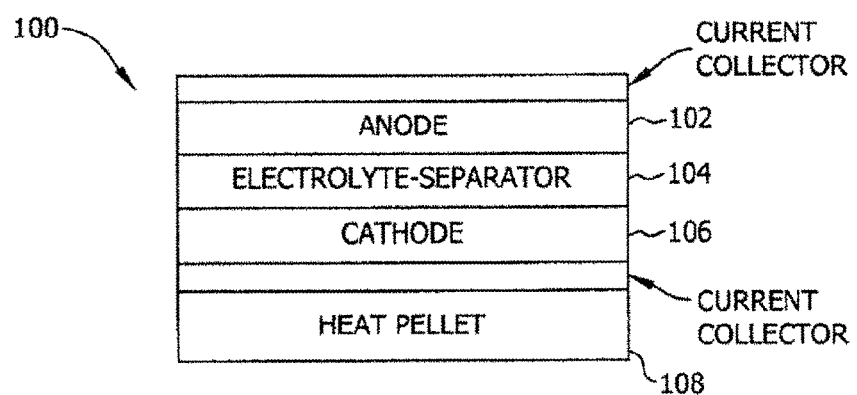
FIG. 1 illustrates an electrochemical device in accordance with various embodiments of the present disclosure.

The present disclosure generally relates to alloys suitable for inclusion in components (e.g., anodes) of thermal batteries and to batteries including the alloys. FIG. 1 illustrates a thermal battery 100, in accordance with various embodiments, and includes an anode 102, an electrolyte-separator 104, and a cathode 106.

As used herein, an "electrochemical device" may otherwise be referred to as a battery (and in some embodiments, a "thermal battery"), a capacitor, a cell, an electrochemical cell, or the like. It should be understood that these references are not limiting, and any device that involves electron transfer between an electrode and an electrolyte is contemplated within the scope of the present disclosure. Further, an electrochemical device may refer to single or multiple connected electrochemical devices, electrochemical cells, batteries or capacitors capable of supplying energy to a load, and none of the references herein to any particular device should be considered to limit the disclosure in any way. In one or more embodiments of the present disclosure, the electrochemical device is a thermal battery.

Thermal battery 100 components may be prepared by consolidating powders via a mechanical pressing operation to produce pellets (i.e., wafers). Thermal batteries using pressed components may be prepared by assembling, in stacks, the various components, such as the anode 102, electrolyte-separator 104, and cathode 106, and, optionally, a heat source pellet 108 if applicable to the particular battery design and application. In some applications, it may not be necessary to include a heat source. For example, for applications in which the battery is introduced into a high temperature environment, introduction into the environment will melt the electrolyte and activate the battery. Assembly of one each of anode 102, electrolyte-separator 104, and cathode 106 comprises a single electrochemical cell. Multiple cells may be stacked in series to produce a thermal battery. Current collectors also may be included. In this regard it should be understood that thermal battery designs other than as shown in FIG. 1 may be used without departing from the scope of the present disclosure.

In accordance with various embodiments of the disclosure, anode material for use in batteries, including thermal batteries, are prepared by consolidating powders via a mechanical pressing operation or other powder handling means, such as tape casting, to produce pellets (i.e., wafers). The pellets are then stacked in a desired arrangement to provide voltage and current when the battery is activated.

An alloy primarily consisting of lithium, silicon and tin may be used as the anode material. In various aspects, the alloy composition may include lithium from about 40 wt % to about 45 wt %, may include silicon from about 25 wt % to about 50 wt % and may include tin from about 10 wt % to about 35 wt %.

The composition of the alloy may vary in accordance with the desired cell application. Exemplary, non-limiting compositions for the alloy are set forth below.

TABLE 1

Exemplary compositions for alloy of embodiments of the present disclosure

| Component | Lithium | Silicon | Tin |
|---|---|---|---|
| Exemplary WT % | 40 | 25 | 35 |
| Exemplary WT % | 40 | 30 | 30 |
| Exemplary WT % | 40 | 32.5 | 27.5 |
| Exemplary WT % | 40 | 35 | 25 |
| Exemplary WT % | 40 | 40 | 20 |
| Exemplary WT % | 40 | 45 | 15 |
| Exemplary WT % | 40 | 50 | 10 |
| Exemplary WT % | 45 | 27.5 | 27.5 |
| Exemplary WT % | 45 | 36 | 19 |
| Exemplary WT % | 45 | 45 | 10 |

In this regard, it should be noted that, more generally, the alloy may contain, in various exemplary embodiments: at least about 40 wt % of lithium, at least about 25 wt % of silicon, and at least about 10 wt % of tin. In addition, it is to be noted that, in one of the exemplary embodiments detailed herein, the concentration of a recited component may be within a range bounded by any combination or permutation of the higher and lower concentration limits noted herein, without departing from the intended scope of the present disclosure.

The alloy may be formed by first melting the metal with the lowest melting point. With respect to lithium, silicon and tin, the metal with the lowest melting point is lithium. Once the lithium is in molten form, tin and silicon are added to the molten lithium simultaneously. However, the method of forming the alloy is not so limited. For example, in an exemplary embodiment, tin may be melted first, followed by the addition of lithium and silicon simultaneously. Once the molten lithium with the silicon and tin is cooled down, the alloy formed preferably is brittle and may be ground into the form of a powder. The powdered form is pressed together to form the wafer (or pellet) which may be used to form an anode. The anode material used to make the anode may contain about 20 wt % of the electrolyte and about 80 wt % of the lithium-silicon-tin alloy. The electrolyte may contain an inorganic binder. For example, the electrolyte can be KCl—LiCl, LiBr—LiCl—LiF, LiBr—KBr, or other halide salt combinations, and the inorganic binder can be MgO, $Y_2O_3$, AlN, BN, or $Al_2O_3$ or other inert, nonreactive inorganic ceramic powders.

Using a pellet formed of the alloy containing lithium, tin and silicon has a volume comparable to that of pellets typically used to form anode materials. The density of tin is only about 6% less than the density of iron. Therefore, a pellet formed of the lithium-silicon-tin alloy has a density comparable to that of the typically used pellets formed of a lithium-silicon alloy powder compressed with iron powder.

Furthermore, using a pellet formed of the alloy containing lithium, tin and silicon provides a longer battery life. In particular, a pellet formed of an alloy containing lithium, silicon and tin has a density significantly higher than a pellet formed from a lithium-silicon alloy. Moreover, the pellet formed of the alloy containing lithium, silicon and tin has a volume comparable to that of a pellet formed of a lithium-silicon alloy with free iron powder added to it. Thus, the weight percentage of lithium can be increased in the pellet resulting in a longer battery life. Typically, a pellet formed of a lithium-silicon alloy with free iron powder added to it consists of approximately 29 wt % of lithium. In comparison, a pellet formed of an alloy containing lithium, silicon and tin consists of at least about 32 wt % of lithium. Moreover, the lithium-silicon-tin alloy may maintain its solid state at temperatures ranging between at least 500° C. and 600° C. thus providing a longer battery life.

The pellet formed of an alloy containing lithium, silicon and tin is also considerably safer than the typical pellets currently being used in the industry. In particular, commonly used lithium-silicon and lithium-aluminum alloys are highly reactive with water and can be a significant fire hazard. In contrast, the lithium-silicon-tin alloy is significantly less reactive with water providing additional safety considerations.

In an alternative embodiment, a composite material may be used as the anode material. The composite material is formed of free lithium and the lithium-silicon-tin alloy. In the composite material, the lithium-silicon-tin alloy serves as a substrate for the free lithium. The composite material maintains its solid state at temperatures of at least 500° C. An anode formed of the composite material produces a higher voltage because the free lithium discharges before the lithium-silicon-tin alloy is discharged. The voltage produced by an anode using the composite material is higher than the voltages produced by the typical lithium-silicon anodes. The composite material also may contain about 20 wt % of the electrolyte and about 80 wt % of the composite material of lithium-silicon-tin alloy and free lithium. The electrolyte may contain an inorganic binder. For example, the electrolyte can be KCl—LiCl, LiBr—LiCl—LiF, LiBr—KBr, or other halide salt combinations, and the inorganic binder can be MgO, $Y_2O_3$, AlN, BN, or $Al_2O_3$ or other inert, nonreactive inorganic ceramic powders.

EXAMPLES

The following non-limiting examples set forth below are illustrative of various aspects of certain exemplary embodiments of the present disclosure. The compositions, methods and various parameters reflected therein are intended only to exemplify various aspects and embodiments of the disclosure, and are not intended to be limiting.

Example 1

Figure 2:
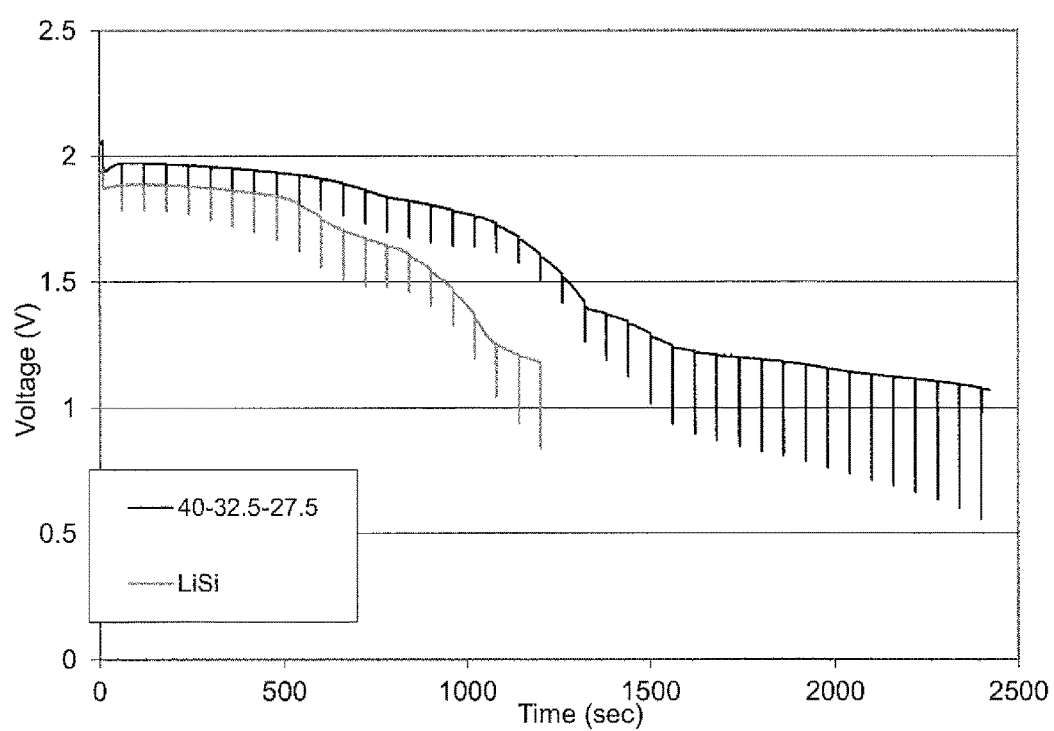
FIG. 2 illustrates a voltage trace diagram of a thermal battery cell in accordance with a first exemplary embodiment of the present disclosure and a voltage trace diagram of a conventional cell that uses a lithium-silicon anode material.

Voltage Traces And Impedance for a Cell Having an Anode Formed of the Lithium-silicon-tin Alloy FIG. 2 illustrates voltage traces for two thermal single cells tested at 500° C., applying a 1 ampere base load with 5 ampere pulses applied every 60 seconds for a 1 second duration. The first thermal single cell includes a lithium-silicon-tin alloy anode having a composition of approximately 40 wt %-32.5 wt %-27.5 wt % respectively, a commonly, used cathode and a commonly used electrolyte-separator material. The anode contained 80 wt % of the lithium-silicon-tin alloy and 20 wt % of KCl—LiCl eutectic electrolyte. The second thermal single cell includes a commonly used lithium-silicon alloy anode, and the same cathode and electrolyte-separator material as that used in the first thermal single cell. The anode contained about 34 wt % KCl—LiCl eutectic electrolyte and iron for improved density.

As seen in FIG. 2, incorporating the anode material formed of the lithium-silicon-tin alloy in the first thermal single cell results in a peak open circuit voltage of approximately 2.05 Volts, with a peak closed circuit voltage of approximately 2.00 Volts. In contrast, the second thermal single cell having a lithium-silicon alloy anode has a peak open circuit voltage output of approximately 1.95 Volts, with a peak closed circuit voltage of approximately 1.90 Volts. Furthermore, the voltage output of the first thermal single cell having the anode material formed of the lithium-silicon-tin alloy is maintained at about 1.9 Volts for a longer duration of time under load. In contrast, the voltage output of the second thermal single cell having a lithium-silicon alloy anode declines more sharply under load with the passing of time in comparison to the first thermal single cell voltage output. That is, the voltage of the cell using the anode comprising the lithium-silicon-tin alloy is sustained and does not "roll-off" until much later in the test compared to the standard anode.

Figure 3:
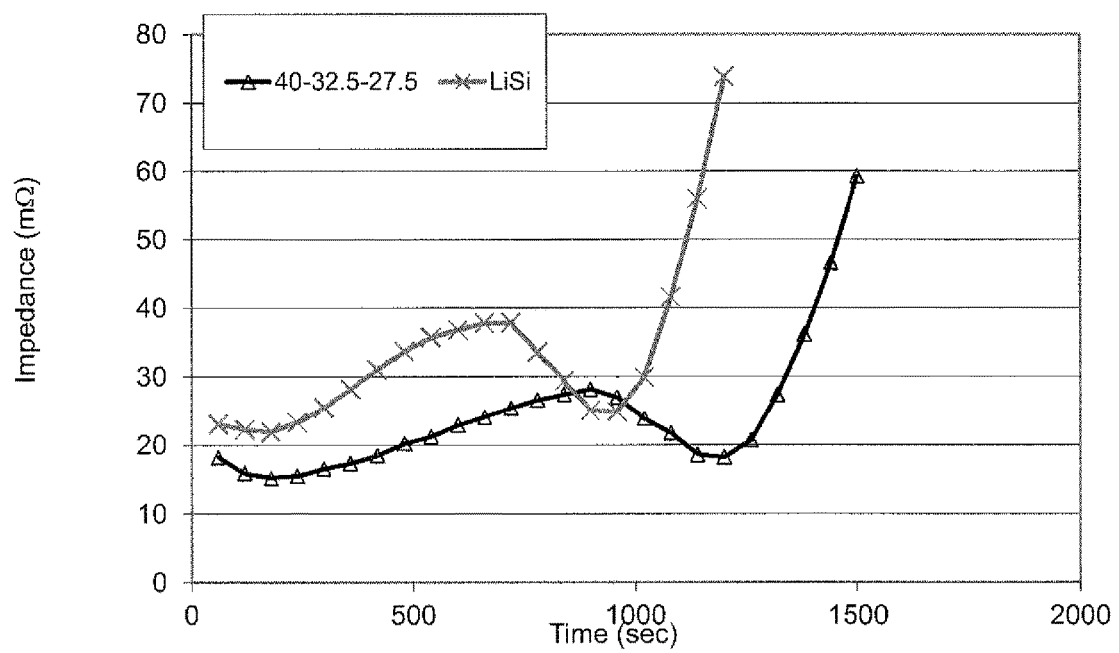
FIG. 3 illustrates an impedance trace diagram of a thermal battery cell in accordance with the first exemplary embodiment of the present disclosure and an impedance trace diagram of the conventional cell.

FIG. 3 shows the impedance traces of the first thermal single cell and the second thermal single cell. As seen in FIG. 3, the impedance level of the first thermal single cell having the anode material formed of the lithium-silicon-tin alloy is lower and maintains its lower level for a longer duration of time when compared to the second thermal single cell having a lithium-silicon alloy anode. As illustrated in FIGS. 2 and 3, the incorporation of the anode material formed of the lithium-silicon-tin alloy, keeping all other components (cathode, electrolyte-separator material) the same, results in a significant improvement over the standard typically used lithium-silicon alloy anode.

Example 2

Figure 4:
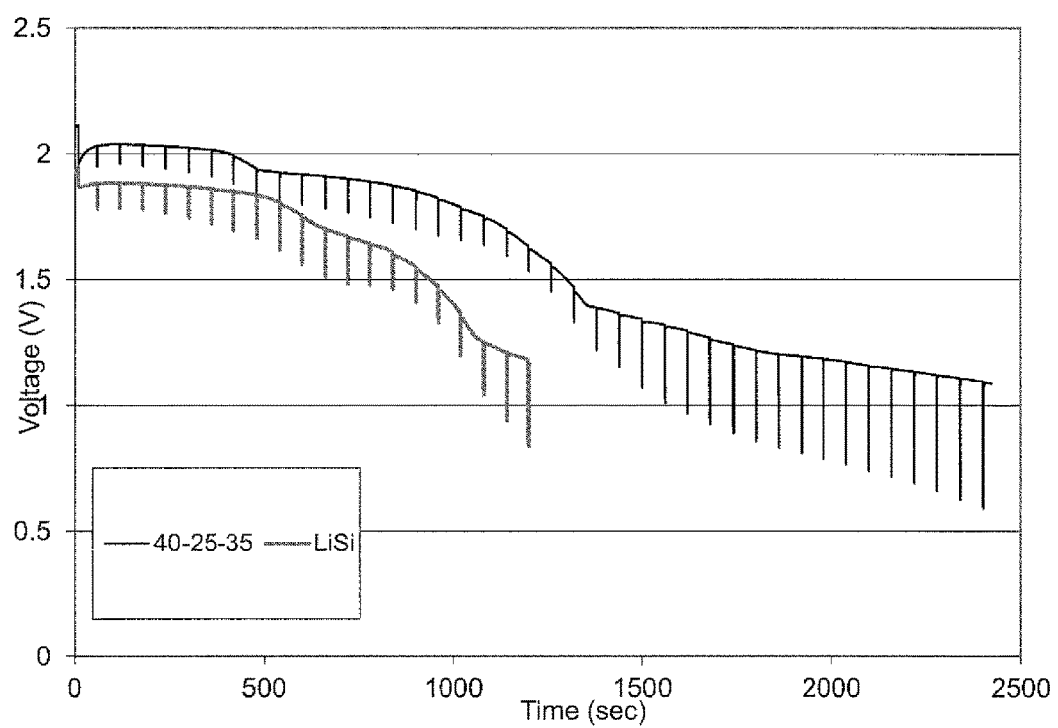
FIG. 4 illustrates a voltage trace diagram of a thermal battery cell in accordance with a second exemplary embodiment of the present disclosure and a voltage trace diagram of the conventional cell.

Voltage Traces and Impedance for a Cell Having an Anode Formed of a Composite Material Containing Free Lithium and the Lithium-silicon-tin Alloy FIG. 4 illustrates voltage traces for two thermal single cells tested at 500° C., applying a 1 ampere base load with 5 ampere pulses applied every 60 seconds for a 1 second duration. The first thermal single cell includes an anode formed of a composite material containing lithium-silicon-tin alloy and free lithium, a commonly used cathode and a commonly used electrolyte-separator material. In this example, the composite material including free lithium and the lithium-silicon-tin alloy has a composition of approximately 40 wt %-25 wt %-35 wt % respectively. Most of the 40 wt % lithium is present in the alloy, but some is present as free lithium. The anode contained 80 wt % of the composite material and 20 wt % of KCl—LiCl eutectic electrolyte. The second thermal single cell includes a commonly used lithium-silicon alloy anode, and the same cathode and electrolyte-separator material as that used in the first thermal single cell. The anode contained about 34 wt % KCl—LiCl eutectic electrolyte and iron for improved density.

As seen in FIG. 4, the first thermal single cell having the anode formed of the composite material has a peak open circuit voltage of approximately 2.1 Volts, with a peak closed circuit voltage of approximately 2.02 Volts. In contrast, the second thermal single cell having a lithium-silicon alloy anode has a peak open circuit voltage output of approximately 1.95 Volts, with a peak closed circuit voltage of approximately 1.90 Volts. Furthermore, the voltage output of the first thermal single cell having the anode formed of the composite material is maintained at about 2 Volts for a longer duration of time. In contrast, the voltage output of the second thermal single cell having a lithium-silicon alloy anode declines more sharply with the passing of time in comparison to the first thermal single cell voltage output. That is, the voltage of the cell using the anode comprising the composite material is sustained and does not "roll-off" until much later in the test compared to the standard anode.

Figure 5:
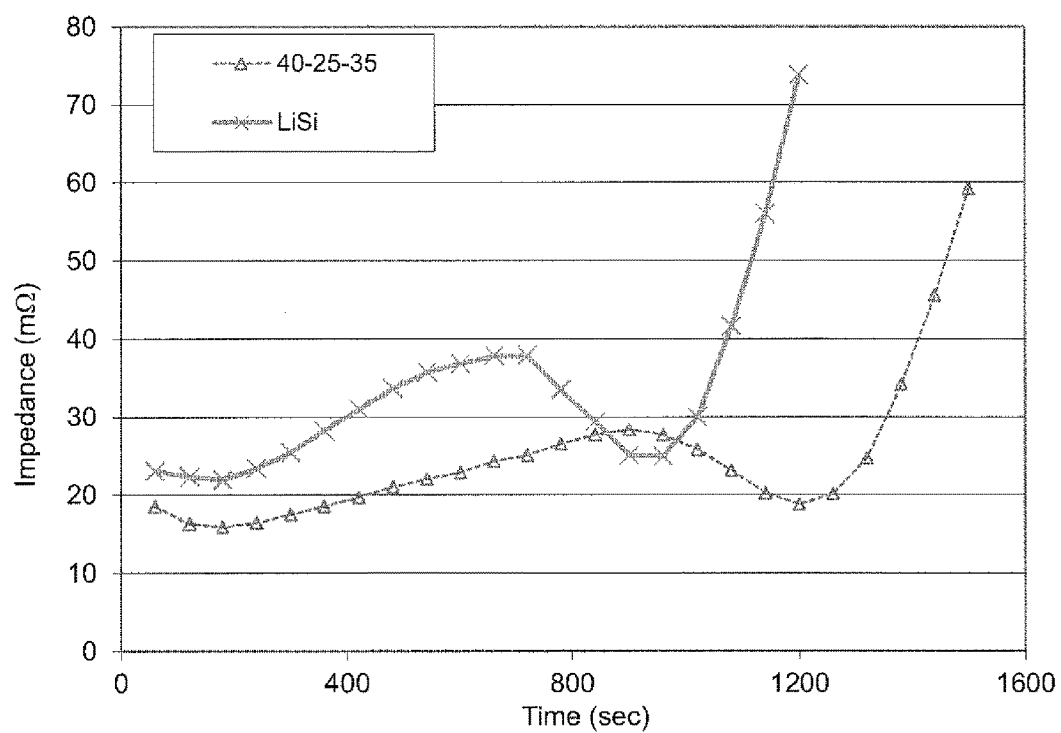
FIG. 5 illustrates an impedance trace diagram of a thermal battery cell in accordance with the second exemplary embodiment of the present disclosure and an impedance trace diagram of the conventional cell.

FIG. 5 shows the impedance traces of the first thermal single cell and the second thermal single cell. As seen in FIG. 5, the impedance level of the first thermal single cell having the anode formed of the composite material is lower and maintains its lower level for a longer duration of time when compared to the second thermal single cell having a lithium-silicon alloy anode. As illustrated in FIGS. 4 and 5, the incorporation of the anode material formed of the composite material, keeping all other components (cathode, electrolyte-separator material) the same, results in a significant improvement over the standard typically used lithium-silicon alloy anode.

Furthermore, FIGS. 3 and 5 illustrate an unexpected benefit of using an anode material which uses the lithium-silicon-tin alloy or the composite material. Typically, the impedance of a thermal battery is determined by the cathode of the battery. However, as illustrated in FIGS. 3 and 5, the impedance of the battery using the anode formed of the lithium-silicon-tin alloy or the composite material is dramatically lower than the impedance of the battery containing a typical anode, even when the same cathode is used in both the cells. This occurs due to the addition of tin which is a conductive material. In particular, the addition of tin replaces some of the wt % of silicon, which is a semiconductor, typically used in anode alloys. The addition of the conductive material lowers the impedance, thereby improving the performance of the cells.

Various principles of the disclosure have been described in illustrative embodiments. However, many combinations and modifications of the above-described formulations, proportions, elements, materials, and components used in the practice of the disclosure, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

Although preferred embodiments pertained to anodes used in thermal batteries, the disclosure is not limited to anodes used in thermal batteries. The disclosure pertains to anodes used in batteries in general or other types of electrochemical cells. Moreover, the alloys and composite materials can be used in applications other than anodes.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above materials and methods without departing from the scope of the disclosure, it is intended that all matter contained in the above description and shown in the accompanying figures shall be interpreted as illustrative and not in a limiting sense.

What is claimed is:

1. An anode material for use in batteries, the anode material comprising:
   an alloy including lithium, silicon and tin, and free lithium mixed with the alloy, wherein the alloy comprises:
      about 40 wt % of lithium,
      about 32.5 wt % of silicon, and
      about 27.5 wt % of tin,
   wherein a battery results in a peak open circuit voltage of 2.05 Volts and a peak closed circuit voltage of 2.00 Volts upon incorporation of the anode material and wherein the alloy is produced by simultaneous addition of at least two selected from the group consisting of lithium, silicon and tin, to a molten metal to provide a composition, the molten metal being one of molten lithium and molten tin, and
      each of the two, which are added simultaneously, being different from the molten metal; and
   the alloy being formed by cooling of the composition, subsequent grinding of the composition into a powdered form, and pressing of the powdered form together to form a pellet, and the anode of the battery includes the pellet.

2. The anode material according to claim 1, further comprising:
   free lithium forming a composite with the alloy of lithium, silicon and tin.

3. The anode material according to claim 1, further comprising an electrolyte mixed with the alloy.

4. The anode material according to claim 3, wherein the anode material includes:
   about 20 wt % of the electrolyte, and
   about 80 wt % of the alloy.

5. The anode material according to claim 1, wherein the alloy is in the form of a powder.

6. An anode comprising a pressed pellet that includes the alloy powder of claim 5 mixed with an electrolyte.

7. The anode according to claim 6, wherein the anode includes:
   about 20 wt % of the electrolyte; and
   about 80 wt % of the alloy powder.

8. A battery comprising:
   an electrolyte-separator material;
   a cathode material that provides a cathode of the battery; and
   an anode material that provides an anode of the battery, the electrolyte-separator material being located between the cathode material and the anode material, and the anode material including an alloy comprised of lithium, silicon and tin, and free lithium, wherein the alloy comprises:
about 40 wt % of lithium,
about 32.5 wt % of silicon, and
about 27.5 wt % of tin,
wherein the battery results in a peak open circuit voltage of 2.05 Volts and a peak closed circuit voltage of 2.00 Volts upon incorporation of the anode material and wherein the alloy is produced by simultaneous addition of at least two selected from the group consisting of lithium, silicon and tin, to a molten metal to provide a composition, the molten metal being one of molten lithium and molten tin, and
each of the two, which are added simultaneously, being different from the molten metal; and
the alloy being formed by cooling of the composition, subsequent grinding of the composition into a powdered form, and pressing of the powdered form together to form a pellet, and the anode of the battery includes the pellet.

9. The battery according to claim 8, further comprising a pyrotechnic heat source.

10. The battery according to claim 8, wherein the anode material includes an electrolyte mixed with the alloy.

11. The battery according to claim 10, wherein the anode material includes:
about 20 wt % of the electrolyte; and
about 80 wt % of the alloy.

12. The battery according to claim 8, wherein the alloy is in the form of a powder.

13. The battery according to claim 8, wherein the battery is a thermal battery in which the electrolyte-separator material, the cathode material and the anode material are solid at ambient temperature.

14. A battery comprising:
an electrolyte-separator material;
a cathode material that provides a cathode of the battery; and
an anode material that provides an anode of the battery,
the electrolyte-separator material being located between the cathode material and the anode material, and
the anode material including an alloy comprised of lithium, silicon and tin, and free lithium, wherein the alloy comprises:
about 40 wt % of lithium,
about 25 wt % of silicon, and
about 35 wt % of tin,
wherein the battery results in a peak open circuit voltage of 2.1 Volts and a peak closed circuit voltage of 2.02 Volts upon incorporation of the anode material and wherein the alloy is produced by simultaneous addition of at least two selected from the group consisting of lithium, silicon and tin, to a molten metal to provide a composition, the molten metal being one of molten lithium and molten tin, each of the two being added simultaneously being different from the molten metal; and
the alloy being formed by cooling of the composition, subsequent grinding of the composition into a powdered form, and pressing of the powdered form together to form a pellet, and the anode of the battery includes the pellet.

\* \* \* \* \*